United States Patent
Dong et al.

(10) Patent No.: US 11,899,221 B2
(45) Date of Patent: *Feb. 13, 2024

(54) APPARATUS AND METHOD FOR ASSEMBLING OPTICAL MODULE

(71) Applicant: GOER OPTICAL TECHNOLOGY CO., LTD., Shandong (CN)

(72) Inventors: Nanjing Dong, Weifang (CN); Debo Sun, Weifang (CN)

(73) Assignee: GOER OPTICAL TECHNOLOGY CO., LTD., Weifang (CN)

(*) Notice: Subject to any disclaimer, the term of this patent is extended or adjusted under 35 U.S.C. 154(b) by 972 days.

This patent is subject to a terminal disclaimer.

(21) Appl. No.: 16/753,308

(22) PCT Filed: Sep. 6, 2018

(86) PCT No.: PCT/CN2018/104386
§ 371 (c)(1),
(2) Date: Apr. 2, 2020

(87) PCT Pub. No.: WO2019/076159
PCT Pub. Date: Apr. 25, 2019

(65) Prior Publication Data
US 2020/0241509 A1  Jul. 30, 2020

(30) Foreign Application Priority Data
Oct. 17, 2017  (CN) .......................... 201710964906.9

(51) Int. Cl.
*G02B 27/62* (2006.01)
*G06T 7/50* (2017.01)
(Continued)

(52) U.S. Cl.
CPC ............. *G02B 27/62* (2013.01); *G02B 7/005* (2013.01); *G02B 7/023* (2013.01); *G06T 7/0004* (2013.01);
(Continued)

(58) Field of Classification Search
CPC ........................... G02B 27/1073; G02B 27/62
See application file for complete search history.

(56) References Cited

U.S. PATENT DOCUMENTS 8,857,029 B2    10/2014  Motohara
11,253,962 B2*   2/2022  Dong ............... G05B 19/41805
(Continued)

FOREIGN PATENT DOCUMENTS

CN       1794096 A     6/2006
CN     101651496 A     2/2010
(Continued)

OTHER PUBLICATIONS

First Office Action in Corresponding Chinese Application No. 201710964906.9, dated Apr. 29, 2023; 23 pgs.
(Continued)

*Primary Examiner* — Steven Whitesell Gordon
(74) *Attorney, Agent, or Firm* — HAUPTMAN HAM, LLP

(57) ABSTRACT

An apparatus and a method for assembling optical module. The apparatus includes: a plurality of fixtures, an alignment mechanism, a power supply, a spectroscopic prism with a light incident surface close to the plurality of optical modules to be aligned, a first color image collecting means close to a first light emitting surface of the spectroscopic prism and a second color image collecting means with a second light emitting surface of the spectroscopic prism; the controller is configured to determine a light spot that does not meet a quality requirement according to the positions and/or
(Continued)

sizes of the plurality of imaging light spots, and generate a corresponding aligning instruction, and determine a to-be-assembled lens necessary to be adjusted according to a color of the light spot that does not meet quality requirements, and output the aligning instruction to an alignment mechanism to adjust a position of the lens necessary to be adjusted.

10 Claims, 9 Drawing Sheets

(51) Int. Cl.
    *G06T 7/70*     (2017.01)
    *G02B 7/00*     (2021.01)
    *G02B 7/02*     (2021.01)
    *G06T 7/00*     (2017.01)

(52) U.S. Cl.
    CPC .................. *G06T 7/50* (2017.01); *G06T 7/70* (2017.01); *G05B 2219/32368* (2013.01); *G05B 2219/45064* (2013.01); *G06T 2207/10024* (2013.01)

(56) References Cited

U.S. PATENT DOCUMENTS

2002/0012506 A1*   1/2002   Iizuka .................. G02B 6/4227
                                              385/91
2011/0075887 A1*   3/2011   Tanaka ................. G02B 6/4221
                                              156/64

FOREIGN PATENT DOCUMENTS

| CN | 102944171 A | 2/2013 |
| CN | 105191280 A | 12/2015 |
| CN | 105721753 A | 6/2016 |
| CN | 105721859 A | 6/2016 |
| CN | 205325158 U | 6/2016 |
| CN | 106488223 A | 3/2017 |
| CN | 206551631 U | 10/2017 |
| CN | 107649875 A | 2/2018 |
| CN | 207663157 U | 7/2018 |
| CN | 207663158 U | 7/2018 |
| CN | 207833129 U | 9/2018 |
| JP | H11295624 A | 10/1999 |

OTHER PUBLICATIONS

CN Office Action in application No. 201721338950.0 dated Mar. 15, 2018.

* cited by examiner

```
┌─────────────────────────────────────────────────────────────────────┐
│ controlling an alignment mechanism to place a plurality of to-be-assembled lenses │
│ to designated positions of the plurality of to-be-assembled optical parts respectively │── 601
│ to obtain a plurality of optical modules to be aligned              │
└─────────────────────────────────────────────────────────────────────┘
                                    ▼
┌─────────────────────────────────────────────────────────────────────┐
│ controlling a power supply to supply power to the plurality of optical modules to be │
│ aligned, so that the plurality of optical modules to be aligned generate images │── 602
└─────────────────────────────────────────────────────────────────────┘
                                    ▼
┌─────────────────────────────────────────────────────────────────────┐
│ collecting, by a first color image collecting means and a second color image │
│ collecting means, positions and sizes of a plurality of imaging light spots │
│ corresponding to the plurality of optical modules to be aligned, and feeding the │── 603
│ positions and sizes to a controller                                 │
└─────────────────────────────────────────────────────────────────────┘
                                    ▼
┌─────────────────────────────────────────────────────────────────────┐
│ determining a light spot that does not meet a quality requirement according to the │
│ positions and/or sizes of the plurality of imaging light spots, and generating a │
│ corresponding aligning instruction, and determining a to-be-assembled lens │── 604
│ necessary to be adjusted according to a color of the light spot that does not meet │
│ quality requirements                                                │
└─────────────────────────────────────────────────────────────────────┘
                                    ▼
┌─────────────────────────────────────────────────────────────────────┐
│ outputting the aligning instruction to an alignment mechanism holding the lens │
│ necessary to be adjusted to adjust a position of the lens necessary to be adjusted │── 605
└─────────────────────────────────────────────────────────────────────┘
```

FIG 6

APPARATUS AND METHOD FOR ASSEMBLING OPTICAL MODULE

CROSS-REFERENCE TO RELATED APPLICATIONS

This application claims priority to Chinese Patent Application No. 201710964906.9, filed Oct. 17, 2017, entitled "Apparatus and Method for Assembling Optical Module", which is hereby incorporated by reference in its entirety.

TECHNICAL FIELD

The present disclosure relates to a field of assembling, and particularly relates to an apparatus and a method for assembling optical module.

BACKGROUND

Nowadays, there are more and more optical modules with independent functions in the market to meet diversified market demands These optical modules may be embedded into other devices to perform their functions, such as camera modules, micro-projection modules, LED (Light Emitting Diode) optical modules, and VR (Virtual Reality)/AR (Augmented Reality) optical modules.

Generally, an optical module is obtained by assembling a plurality of optical elements and other parts. For example, a camera module may be obtained by assembling components such as image sensors, lens mounts, a plurality of lenses, and circuit boards. More particularly, an accuracy in assembling the lens plays a decisive role in an optical performance of an optical module. In a method for assembling optical module, a light spot of image and/or an image of the optical module in the assembling is obtained by an image collecting means, and analyzing is performed to determine whether the lenses are aligned according to the collected result of imaging, and the position of the to-be-assembled lenses are constantly adjusted in a case that the to-be-assembled lenses are not aligned.

However, methods for actively aligning lenses of optical module according to the result of imaging in the prior art still have a disadvantage of low efficiency.

BRIEF SUMMARY

In view of this, the present disclosure provides an apparatus and a method for assembling optical module to solve the problem of the low efficiency in actively aligning lenses of optical module.

In one embodiment of the present disclosure, an apparatus for assembling optical module is provided. The apparatus includes:

a plurality of fixtures configured to a plurality of to-be-assembled optical parts respectively, an alignment mechanism configured to place a plurality of to-be-assembled lenses to designated positions of the plurality of to-be-assembled optical parts respectively to obtain a plurality of optical modules to be aligned; and a power supply configured to supply power to the plurality of optical modules to be aligned;

a spectroscopic prism with a light incident surface close to the plurality of optical modules to be aligned, a first color image collecting means close to a first light emitting surface of the spectroscopic prism and being coaxial with the first light emitting surface, and a second color image collecting means with a second light emitting surface of the spectroscopic prism and being coaxial with the second light emitting surface; the first color image collecting means and the second color image collecting means are respectively configured to collect positions and sizes of a plurality of imaging light spots corresponding to the plurality of optical modules to be aligned, and feed the positions and sizes to a controller;

the controller is configured to determine a light spot that does not meet a quality requirement according to the positions and/or sizes of the plurality of imaging light spots, and generate a corresponding aligning instruction, and determine a to-be-assembled lens necessary to be adjusted according to a color of the light spot that does not meet quality requirements, and output the aligning instruction to an alignment mechanism holding the lens necessary to be adjusted to adjust a position of the lens necessary to be adjusted.

Furthermore, the apparatus further includes: a positive lens provided between the first color image collecting means and the spectroscopic prism and being coaxial with the first color image collecting means.

In some embodiments, the positive lens includes: an aspherical positive lens.

In some embodiments, the spectroscopic prism includes two right-angle prisms with oblique surfaces bonded, and bonded surfaces are coated with a transflective dielectric film having a transmittance and a reflectance in a ratio of 1:1.

In some embodiments, the alignment mechanism includes a first robot arm electrically connected to the controller, and an integration mechanism mounted on the first robot arm, and a plurality of aligning heads are integrated on the integration mechanism.

In some embodiments, the apparatus further includes a dispensing mechanism; the dispensing mechanism includes a second robot arm electrically connected to the controller and a UV dispensing syringe fixed on the second robot arm; the dispensing mechanism is configured to perform dispensing on the plurality of to-be-assembled optical parts according to a dispensing instruction of the controller.

In some embodiments, the dispensing mechanism further includes a third image collecting means fixed on the second robot arm.

In some embodiments, UV lamps electrically connected to the controller are provided on the alignment mechanisms respectively.

In some embodiments, a sensor is provided on each of the plurality of fixtures and configured to detect whether a to-be-assembled optical part is placed on the fixture.

The present disclosure further provides a method for assembling optical module applicable to the apparatus for assembling optical module provided by the present disclosure. The method includes:

controlling an alignment mechanism to place a plurality of to-be-assembled lenses to designated positions of the plurality of to-be-assembled optical parts respectively to obtain a plurality of optical modules to be aligned;

controlling a power supply to supply power to the plurality of optical modules to be aligned, so that the plurality of optical modules to be aligned generate images; collecting, by a first color image collecting means and a second color image collecting means, positions and sizes of a plurality of imaging light spots corresponding to the plurality of optical modules to be aligned, and feeding the positions and sizes to a controller;

determining a light spot that does not meet a quality requirement according to the positions and/or sizes of the plurality of imaging light spots, and generating a corresponding aligning instruction, and determining a to-beassembled lens necessary to be adjusted according to a color of the light spot that does not meet quality requirements;

outputting the aligning instruction to an alignment mechanism holding the lens necessary to be adjusted to adjust a position of the lens necessary to be adjusted.

In the present disclosure, a plurality of groups of optical modules to be aligned are subjected to an assembling process at the same time. During the assembling process, light sources of different colors are used for the plurality of groups of optical modules to be aligned to generate images, and color image collecting means are used to collect positions and sizes of light spots and the color information of the light spots at the same time. Furthermore, the controller may recognize which to-be-assembled lenses in the optical module to be aligned need to be further aligned and how to perform aligning according to the positions and/or sizes and colors of the light spot, and generate an aligning instruction to control the corresponding alignment mechanism to perform the aligning movement. Therefore, the efficiency in assembling the optical module are improved.

The above description is merely a brief introduction of the technical solutions of the present disclosure, so that the technical means of the present disclosure may be clearly understood, and implemented according to the description of the specification, and the above and other technical objects, features and advantages of the present disclosure may be more obvious based on the embodiments of the present disclosure as follows.

BRIEF DESCRIPTION OF THE DRAWINGS

Drawings needed in the description of the embodiments and the prior art shall be explained below, so as to explain the technical solutions in the embodiments of the present disclosure and the prior art more clearly. It is obvious that the drawings explained below are merely some embodiments of the present disclosure, and a person of ordinary skill in the art may obtain other drawings according to these drawings without making an inventive effort.

FIG. 6 is a flowchart of a method for assembling optical module according to an embodiment of the present disclosure.

DETAILED DESCRIPTION

In order to make the objectives, technical solutions, and advantages of the embodiments of the present disclosure clearer, the technical solutions in the embodiments of the present disclosure will be clearly and completely described with reference to the drawings in the embodiments of the present disclosure. Obviously, the described embodiments are some of the embodiments of the present disclosure, not all of the embodiments. Based on the embodiments in the present disclosure, all other embodiments obtained by one skilled in the art without making creative efforts shall fall within the protection scope of the present disclosure.

It should be noted that, in the following embodiments of the present disclosure, an optical module refers to a complete product with the alignment completed and the fixing completed; an optical module to be aligned refers to an optical module in the assembly process, which may be in a state of being unaligned or aligned; a to-be-assembled optical part refers to the semi-finished product of an optical module, and the to-be-assembled lenses needs to be aligned and assembled at its designated position and fixed to obtain an optical module. The above-mentioned concepts mentioned below may be understood with reference to the above explanations, and detailed may be omitted to avoid redundancy.

In a method for assembling optical module, the position of the to-be-assembled lens in the optical module to be aligned may be adjusted in real time according to the imaging result of the optical module to be aligned. When there are a plurality of optical modules to be aligned that need to be assembled at the same time, it is necessary to sequentially light up the light sources of object-side of the optical modules to be aligned and sequentially perform aligning on the lenses. The efficiency of such operation is low. In order to solve the above defects, the present disclosure provides an apparatus for assembling optical module as shown in FIG. 1a.

Figure 1A:
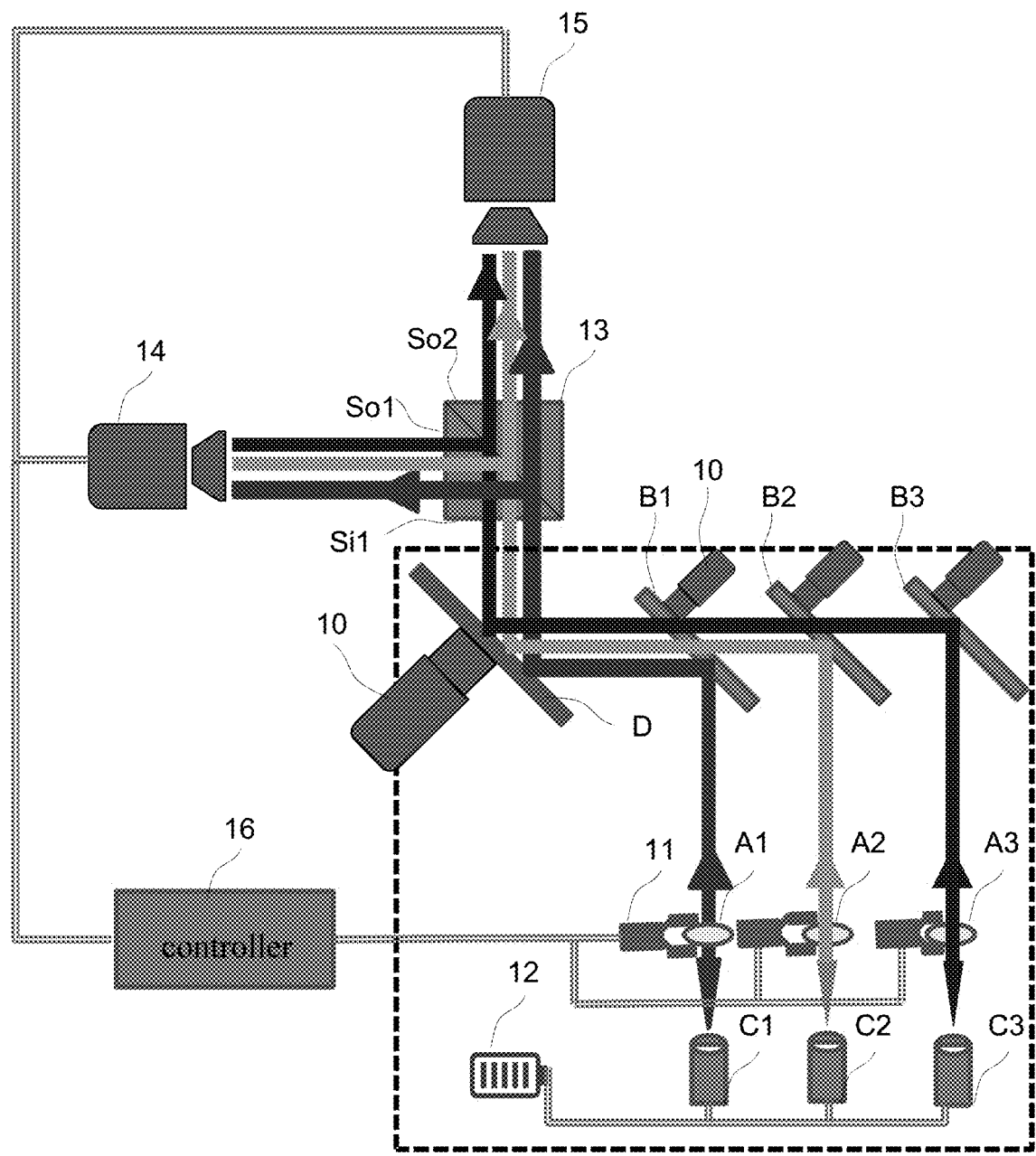
FIG. 1a is a schematic structural diagram of an apparatus for assembling optical module according to an embodiment of the present disclosure.

FIG. 1a is a schematic structural diagram of an apparatus for assembling optical module according to an embodiment of the present disclosure. With reference to FIG. 1a, the apparatus includes:

a plurality of fixtures 10 configured to a plurality of to-be-assembled optical parts respectively, an alignment mechanism 11 configured to place a plurality of to-be-assembled lenses to designated positions of the plurality of to-be-assembled optical parts respectively to obtain a plurality of optical modules to be aligned; and a power supply 12 configured to supply power to the plurality of optical modules to be aligned; and a spectroscopic prism 13 with a light incident surface $S_i$ close to the plurality of optical modules to be aligned, a first color image collecting means 14 close to a first light emitting surface $S_o1$ of the spectroscopic prism 13 and being coaxial with the first light emitting surface $S_o1$, and a second color image collecting means 15 with a second light emitting surface $S_o2$ of the spectroscopic prism 13 and being coaxial with the second light emitting surface $S_o2$.

More particularly, the first color image collecting means 14 and the second color image collecting means 15 are respectively configured to collect positions and sizes of a plurality of imaging light spots corresponding to the plurality of optical modules to be aligned, and feed the positions and sizes to a controller 16; the controller 16 is configured to determine a light spot that does not meet a quality requirement according to the positions and/or sizes of the plurality of imaging light spots, and generate a corresponding aligning instruction, and determine a to-be-assembled lens necessary to be adjusted according to a color of the light spot that does not meet quality requirements, and output the aligning instruction to an alignment mechanism holding the lens necessary to be adjusted to adjust a position of the lens necessary to be adjusted.

Figure 1B:
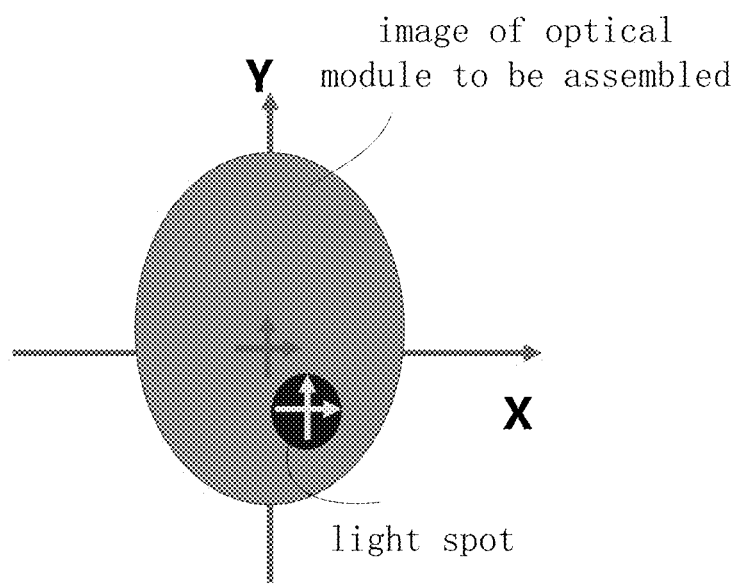
FIG. 1b is a schematic diagram of an image including a light spot and an optical module to be aligned according to an embodiment of the present invention.

More particularly, as shown in FIG. 1b, the position of an imaging light spot may refer to a position of the imaging light spot with respect to a center point of the image of the optical module to be aligned in the images containing the optical module to be aligned and the imaging light spot captured by the first color image collecting means 14.

It should be noted that, in the dashed box in FIG. 1a, in addition to the labeled fixture 10, the alignment mechanism 11, and the power supply 12, A1 to A3 are schematic illustration of to-be-assembled lenses, and B1 to B3 are schematic illustration of the reflector included in a to-be-assembled optical part, C1 to C3 are schematic illustration of a light source inside the to-be-assembled optical part or an external light source, and D is a schematic illustration of a reflector for changing the direction of the optical path. The i-th group of optical modules to be aligned may be mainly composed of Ai and Bi, where i is an integer and i is greater than zero. It should be understood that the above-mentioned schematic illustration of the optical path structure including Ai, Bi, Ci, and D is merely for the convenience of describing the technical solution of the present invention, and it does not constitute a limitation on the essence of the present invention. When the internal structure or function of the optical module changes, this part of the optical path structure should be changed accordingly, and detailed description would be omitted to avoid redundancy. In addition, FIG. 1a illustrates the present disclosure with three groups of optical modules to be aligned as an example, but the apparatus provided by the present invention includes, but is not limited to, the simultaneous assembling of three groups of optical modules to be aligned.

For each group of optical modules to be aligned, when the light source of object-side is lighted, light of the light source of object-side may pass through the optical module to be aligned. The light passing through the optical module to be aligned may be split into two beams by the beam splitting surface of the spectroscopic prism 13 after passing through the spectroscopic prism 13, and the two beams of light go in different propagating directions respectively.

In some embodiments, the spectroscopic prism 13 may be formed by bonding oblique surfaces of two right-angle prisms, and bonded surfaces may be coated with a transflective dielectric film having a transmittance and a reflectance in a ratio of 1:1. Therefore, the light incident from the light incident surface $S_i$ of the spectroscopic prism 13 may be split by the transflective dielectric film into two beams with similar intensities and directions perpendicular with each other. More particularly, the light reflected by the transflective dielectric film may be emitted out of a first light emitting surface $S_o1$, and the light transmitted by the transflective dielectric film may be emitted out of a second light emitting surface $S_0 2$. Therefore, the first color image collecting means 14 and the second color image collecting means 15 may respectively capture images in the range of their viewing angles.

It should be understood that in order to ensure the optical performance of the optical module, aligning the to-be-assembled lenses includes aligning the to-be-assembled lenses with respect to the to-be-assembled optical part in three axes of XYZ, during the assembling of each group of optical modules. More particularly, the coordinates on Z-axis may represent a distance between the to-be-assembled lens and a center point of the to-be-assembled optical part, and the coordinates on X and Y axis represent the offset of the to-be-assembled lens with respect to the to-be-assembled optical part in up, down, left, and right direction.

With a group of optical modules to be aligned as an example, in a feasible implementation, the controller 16 may perform analyzing on the position of the to-be-assembled lens in the optical module to be aligned with respect to the optical module to be aligned according to an image including an imaging light spot of the optical modules to be aligned and the optical modules to be aligned captured by the first color image collecting means 14. FIG. 1b illustrates an image including the optical module to be aligned and an imaging light spot thereof captured by the first color image collecting means 14. In the XY plane shown in FIG. 1b, the light spot is located at the down-right position of the image of the optical module to be aligned.

The position of the light spot may indicate that the to-be-assembled lens is not aligned, if the center of the image of the optical module to be aligned is used as the alignment reference point.

In some embodiments, the controller 16 may perform analyzing to determine the distance from the center point of to-be-aligned lenses in the optical module to be aligned with respect to the center point of to-be-assembled optical part according to the sizes of the light spot shown in the image including the imaging light spot of the optical module to be aligned captured by the second color image collecting means 15. Upon determining the position of the to-be-assembled lens with respect to the to-be-assembled optical part and the distance between the position and the center point of the to-be-assembled optical part, the controller 16 may generate a corresponding aligning instruction and send the aligning instruction to the alignment mechanism holding the to-be-assembled lens, so that the alignment mechanism 11 performs three-axis or six-axis movement to adjust the position of the to-be-assembled lens.

In some embodiments, when the position of the to-be-assembled lens with respect to the to-be-assembled optical part do not meet a preset requirement, the controller 16 may control the corresponding alignment mechanism 11 to move in the X or Y direction to constantly adjust the position of the to-be-assembled lens until the requirement is met. When the distance between the to-be-assembled lens and the center point of the to-be-assembled optical part does not meet the preset requirement, the controller 16 may control the corresponding alignment mechanism 11 to move in the Z direction to constantly adjust the position of the to-be-assembled lens until the requirement is met.

In some embodiments, when a plurality of groups of to-be-assembled modules are subjected to aligning simultaneously, in order to ensure that the controller 16 can identify the light spots corresponding to each group of optical modules to be aligned and perform correct aligning control, in the present embodiment, light sources of different colors may be used for imaging of optical modules to be aligned.

Furthermore, the first color image collecting means 14 and the second color image collecting means 15 may capture imaging light spots of a plurality of groups of optical modules in different colors. After the controller 16 receives the images fed back by the first color image collecting means 14 and the second color image collecting means 15, it can first determine these light spots are obtained from which group of optical modules to be aligned according to the colors of the light spots in the image, so as to establish the correspondence between the light spot and the optical module to be aligned.

For the light spot in each color, the controller 16 may further perform analyzing to determine whether the to-be-assembled lenses in the optical module to be aligned corresponding to the light spot are aligned according to the position and/or size of the light spot, and if not, the controller 16 may generate a corresponding aligning instruction, and send the aligning instruction to an alignment mechanism holding the to-be-assembled lens. Therefore, the alignment mechanism may move to adjust the position of the to-be-assembled lens until the position and size of the light spot meet the preset requirements.

Figure 2A:
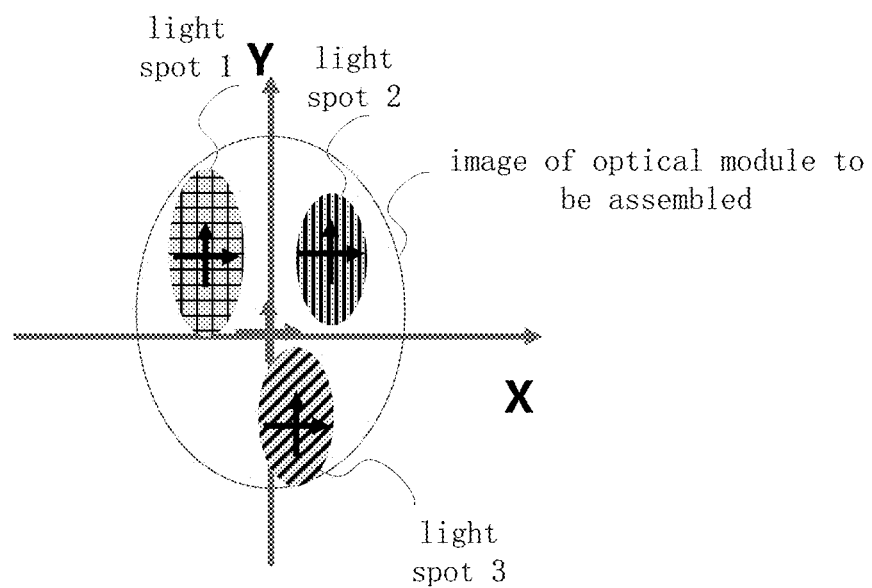
FIG. 2a is a schematic diagram of an image including an imaging light spot and an optical module to be aligned captured by a first color image collecting means.
Figure 2B:
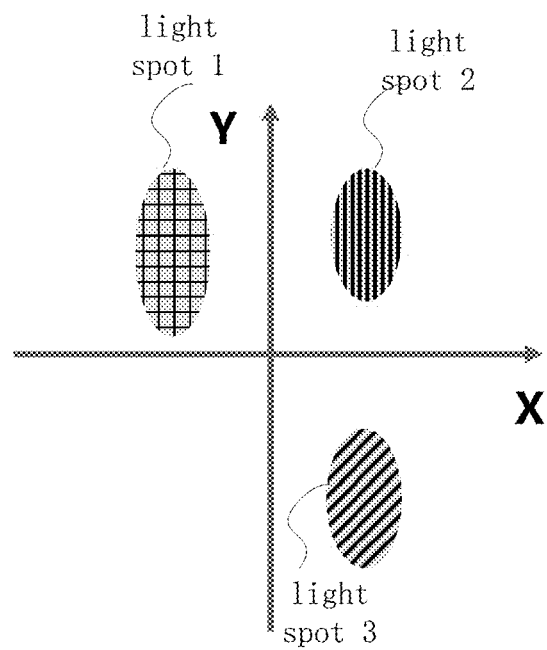
FIG. 2b is a schematic diagram of an image including an imaging light spot captured by a second color image collecting means.

As shown in FIG. 2a and FIG. 2b, the light spot 1 marked by a grid pattern may be a red spot, the light spot 2 marked by a vertical stripe may be a green spot, and the light spot 3 marked by an oblique stripe may be a yellow spot. In FIG. 2a, the first color image collecting means 14 captures three light spots in different colors and an image of the optical module to be aligned. According to FIG. 2a, the positional relationship between three light spots of different colors and the center point of the image of the optical module to be aligned may be determined by analyzing. In FIG. 2b, the second color image collecting means 15 captures three light spots in different colors. According to FIG. 2b, the sizes of the three light spots in different colors may be determined by analyzing.

Detailed explanation would be made on the embodiments of the present disclosure in the following based on a practical example. For example, in FIG. 1, it is assumed that the light source of object-side of the first group of optical modules to be aligned composed of the to-be-assembled lens A1 and the optical module B1 to be aligned is a red light source, the light source of object-side of the second group of optical modules to be aligned composed of the to-be-assembled lens A2 and the optical module B2 to be aligned is a green light source, the light source of object-side of the third group of optical modules to be aligned composed of the to-be-assembled lens A3 and the optical module B3 to be aligned is a yellow light source. When three groups of optical modules to be aligned are imaged at the same time, the first color image collecting means 14 and the second color image collecting means 15 may respectively capture the positions and sizes of the light spots in three colors and feed them back to the controller 16. Assuming that the controller 16 determines that the green light spot does not meet the quality requirement according to the position and/or size of the light spot, it may generate an aligning instruction according to the position and/or size of the green light spot, and output the aligning instruction to the alignment mechanism holding the to-be-assembled lens A2 to adjust the position of the to-be-assembled lens A2.

In some embodiments, in order to ensure that the first image collecting means 14 capture not only the imaging light spot of the optical module to be aligned, but also the optical module to be aligned, a distance between the first image collecting means 14 and the spectroscopic prism 13 may be properly increased to meet the requirements for the first image collecting means 14 to capture the optical module to be aligned when setting the distance between the first image collecting means 14 and the spectroscopic prism 13.

Figure 3:
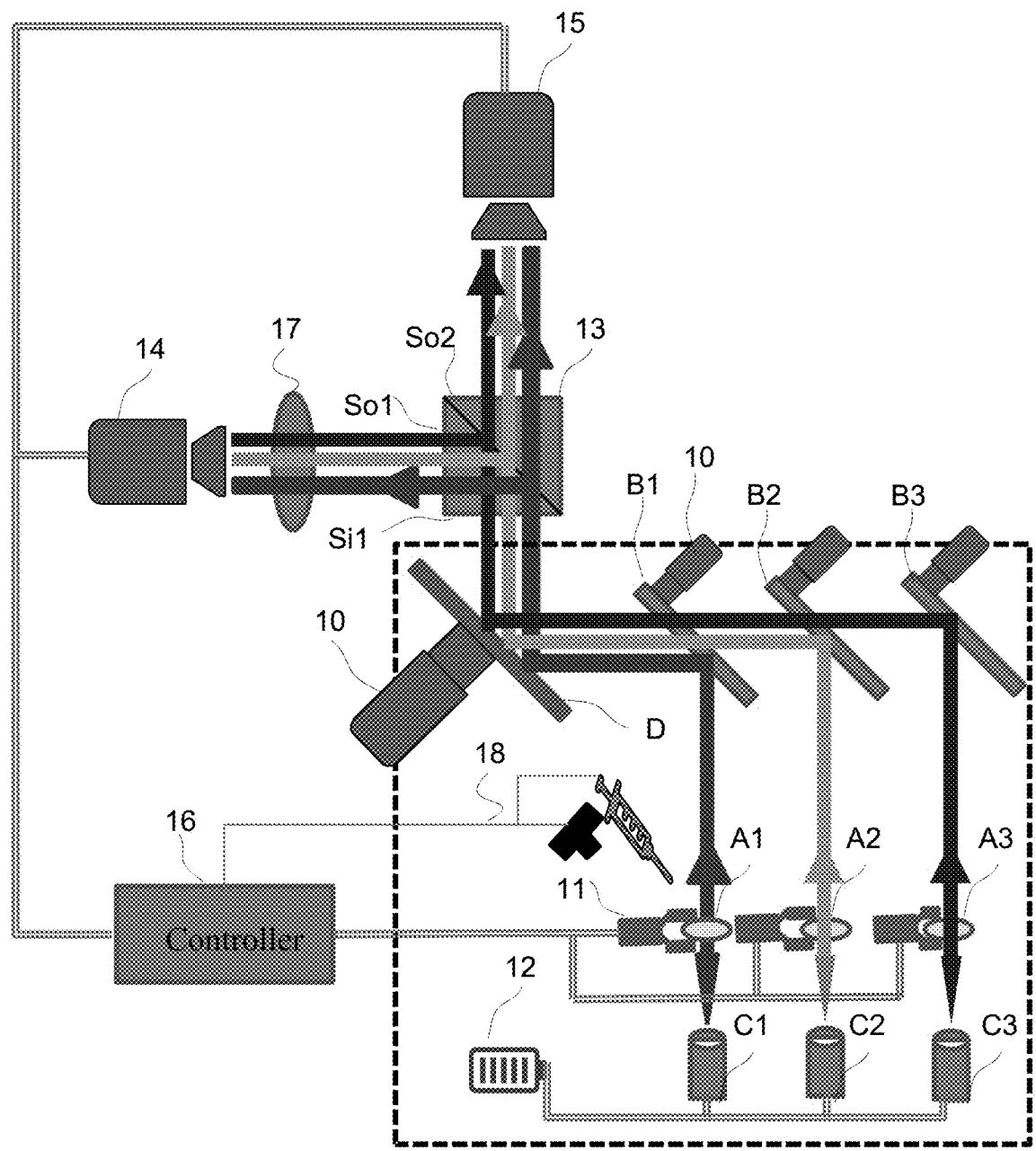
FIG. 3 is a schematic structural diagram of an apparatus for assembling optical module according to another embodiment of the present disclosure.

In some embodiments, in order to reduce the size of the apparatus and ensure the quality for the first color image collecting means 14 to capture the optical module to be aligned, as shown in FIG. 3, in the present embodiment, a positive lens 17 may be provided between the first color image collecting means 14 and the spectroscopic prism 13. More particularly, the positive lens 17 may be coaxial with the first color image collecting means 14. Therefore, the positive lens 17 having a positive power may assist in expanding the field angle of the first color image collecting means 14. In some embodiments, the positive lens 17 may be a single lens or a lens group In some embodiments, the positive lens 17 may include an aspherical lens, which may make the light spot captured by the first color image collecting means 14 have a smaller spherical aberration, and thus more accurate analyzing may be made to determine the relative positions of the light spot and the optical module to be aligned.

In the embodiment of the present invention, the plurality of fixtures 10 may be a vacuum chuck or an adjustable mechanical clamp. Each of the plurality of fixtures 10 may respectively hold the to-be-assembled optical part thereon, ensuring that the to-be-assembled optical part are accurately placed at a designated position on the turntable.

In some embodiments, a sensor may be provided on each of the plurality of fixtures and configured to detect whether a to-be-assembled optical part is placed on the fixture. For example, a pressure sensor may be provided at the bottom of the fixture. If a to-be-assembled optical part is already placed on the fixture, the pressure sensor may detect a pressure change and send the pressure change to the controller 16. For example, an infrared or ultrasonic sensor may be provided on the fixture. If the to-be-assembled optical part is already placed on the fixture, the infrared or ultrasonic sensor may detect a change in the time difference between transmitting and receiving signals and send the change to the controller 16. The control 16 may determine whether there is a to-be-assembled optical part on the fixture according to the signal sent by the sensor, and then generate a corresponding operating instruction to avoid the idle operation of the alignment mechanism 11, the dispensing mechanism 18 or other mechanisms.

Figure 4A:
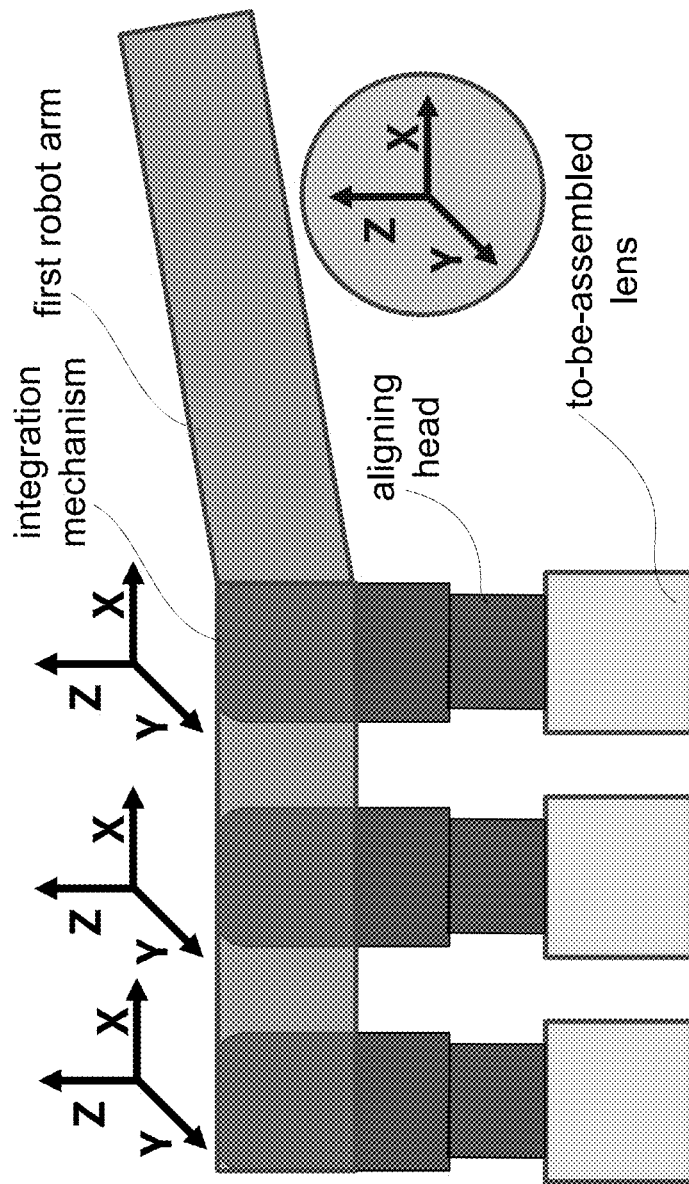
FIG. 4a is a schematic structural diagram of an alignment mechanism 11 according to an embodiment of the present disclosure.
Figure 4B:
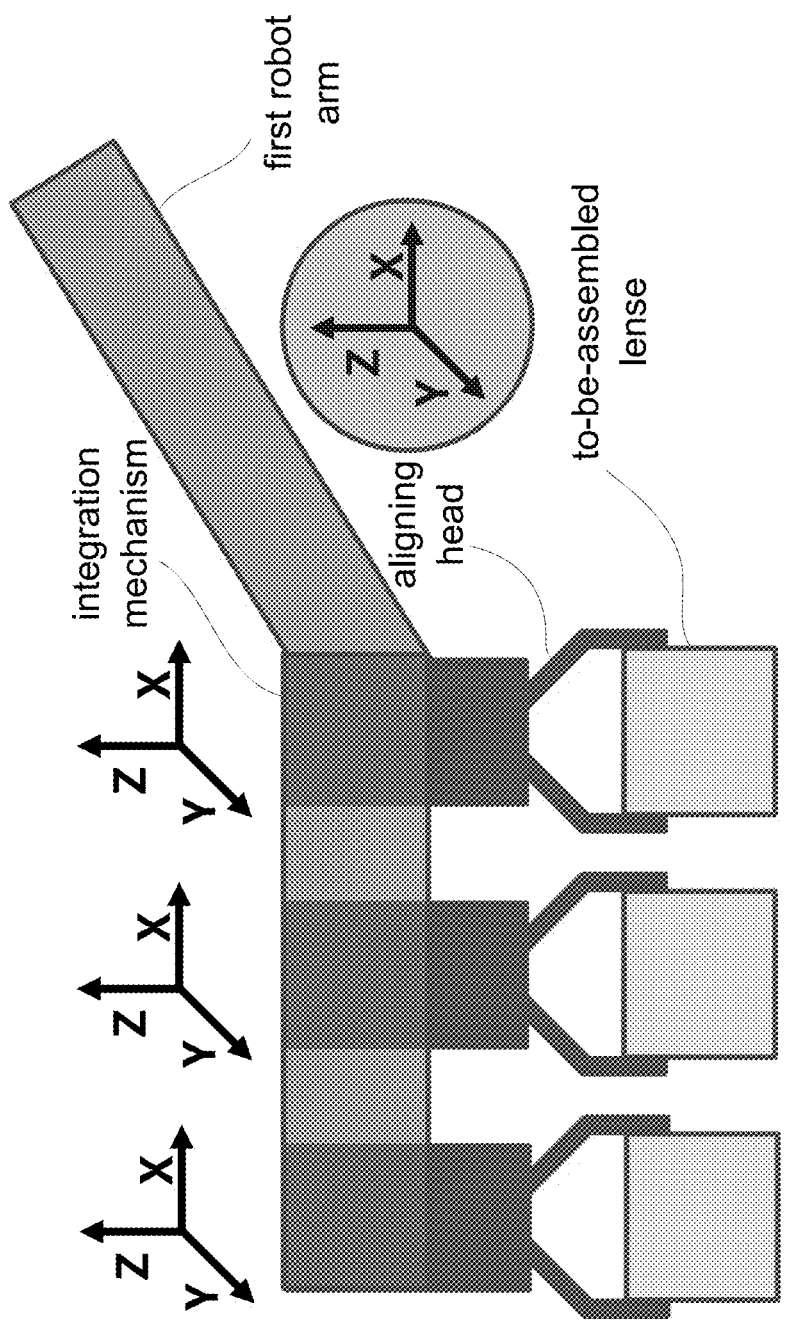
FIG. 4b is another schematic structural diagram of an alignment mechanism 11 according to an embodiment of the present disclosure.

In some embodiments, the alignment mechanism 11 may include a plurality of independent alignment mechanisms to meet the needs of assembling multiple groups of optical modules at the same time. In some embodiments, the alignment mechanism 11 may further include a plurality of integrated aligning heads. When a plurality of integrated aligning heads are included, the alignment mechanism 11 includes: a first robot arm electrically connected to the controller 16, and an integration mechanism mounted on the first robot arm, and a plurality of aligning heads are integrated on the integration mechanism. As shown in FIG. 4a and FIG. 4b, the first robot arm may perform three-axis movement in the X, Y, and Z directions according to the control instructions of the controller 16, and a plurality of aligning heads on the integrated mechanism may independently perform three-axis movements in X, Y, Z directions. The first robot arm may move the to-be-assembled lenses from the loading rack to the operating position of the alignment mechanism 11, and a plurality of aligning heads on the integration mechanism may respectively move the grasped to-be-assembled lenses to the theoretical positions thereof. Of course, the first robot arm and a plurality of aligning heads on the integration mechanism may also perform six-axis movement (X, Y, Z, θX, θY, and θZ) or even other multi-axis movement as required under control instructions of the controller 11. There is no limitation in the embodiments of the present disclosure.

In an alternative embodiment, as shown in FIG. 1a and FIG. 3, the apparatus further includes a dispensing mechanism 18. The dispensing mechanism 18 may perform dispensing on the to-be-assembled optical part. In the dispensing operation, the dispensing mechanism 18 may apply a specific glue to the to-be-assembled optical part by coating, potting or dripping, so that the dispensing portion has a certain viscosity, and then to-be-assembled lenses may be fixed after the to-be-assembled lenses are aligned, to finally obtain a complete product of optical module. The dispensing mechanism 18 may perform a dispensing operation before or after the to-be-assembled lenses are aligned, and there is no limitation on the order in the present embodiment.

Figure 5:
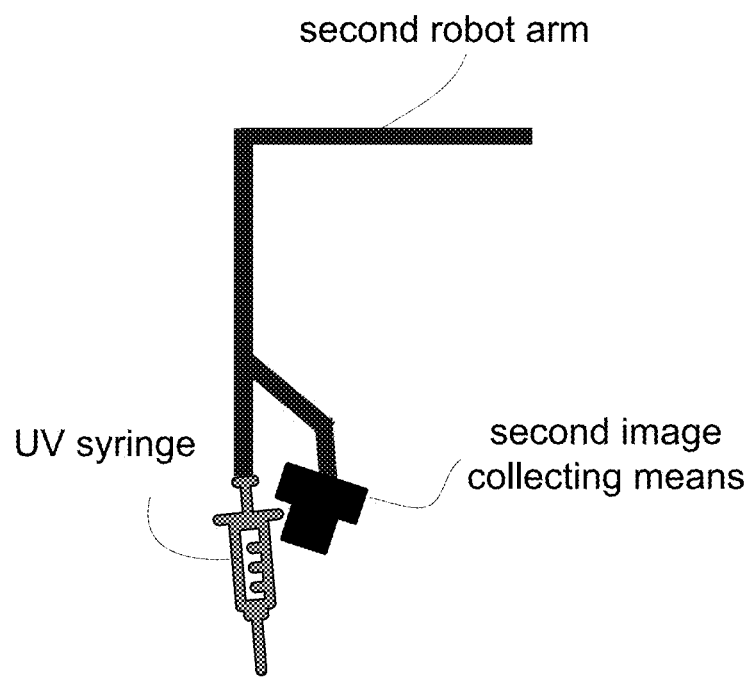
FIG. 5 is a schematic structural diagram of a dispensing mechanism 18 according to an embodiment of the disclosure.

In some embodiments, as shown in FIG. 5, the dispensing mechanism 18 includes a second robot arm electrically connected to the controller, and a UV dispensing syringe mounted on the second robot arm. The second robot arm may bring the UV dispensing syringe to a designated dispensing position under the control of the controller 11, and the UV dispensing syringe performs a dispensing operation. More particularly, the UV dispensing syringe may store UV (Ultraviolet Rays) glue therein, i.e., shadowless glue, also known as photosensitive glue or ultraviolet curing glue, which has high adhesion and may be cured rapidly, which may indirectly improve the efficiency in assembling optical modules.

In some embodiments, as shown in FIG. 5, to ensure that the dispensing mechanism 18 may dispense at the correct position, a third image collecting means may be further mounted on the second robot arm. The third image collecting means may capture an actual image of the to-be-assembled optical part before dispensing, and send the captured image to the controller 16. The controller 16 performs recognition according to the received image, determines the dispensing position and sends a specific dispensing instruction to the dispensing mechanism 18.

In some embodiments, a UV lamp may be provided on the alignment mechanism 11. The UV lamp may be electrically connected to the controller 16 and receive a curing instruction from the controller 16, light after the alignment of the to-be-assembled lenses to accelerate the curing of the UV glue and improve the efficiency in assembling optical modules.

In some embodiments, a power supply 12 may supply power to the optical module to be aligned, so that the optical module to be aligned generates an image. In some embodiments, according to the performance of optical modules, a light source is provided in some of to-be-assembled optical parts, such as a semi-finished product of a micro-projection module. After the light source is turned on, image may be generated at the image side of optical module to be aligned.

It should be understood that, for a to-be-assembled optical part without a light source, such as a semi-finished product of a camera module, in order to image such to-be-assembled optical part, the apparatus for assembling optical module provided in the embodiment further includes a light source. In some embodiments, for the optical module to be aligned on the fixture moved to the operating position of the alignment mechanism, the light source is located on the object side of the optical module to be aligned, and parallel light may be generated to make the optical module to be aligned generate image. The light source may be connected to the power source, and its switching state may be controlled by the controller 16.

In the present disclosure, a plurality of groups of optical modules to be aligned are subjected to an assembling process at the same time. During the assembling process, light sources of different colors are used for the plurality of groups of optical modules to be aligned to generate images, and color image collecting means are used to collect positions and sizes of light spots and the color information of the light spots at the same time. Furthermore, the controller may recognize which to-be-assembled lenses in the optical module to be aligned need to be further aligned and how to perform aligning according to the positions and/or sizes and colors of the light spot, and generate an aligning instruction to control the corresponding alignment mechanism to perform the aligning movement. Therefore, the efficiency in assembling the optical module are improved.

In addition, in the present embodiment, for each group of optical modules to be aligned, the optical modules in the process of assembling are imaged, and a spectroscopic prism and two groups of image collecting means are used to obtain images by or of the optical modules in two different directions. Therefore, the controller may determine whether the to-be-assembled lenses are aligned in all three axes according to the imaging results collected by the two group of image collecting means. In the case that the lenses are unaligned, the alignment mechanism is constantly controlled to adjust the position of the to-be-assembled lens. The above alignment process with simultaneous three-axis feedback effectively reduces the assembly tolerance of the entire optical module, improves the accuracy in assembling the optical module, and effectively ensures the optical performance of the optical module.

FIG. 6 is a flowchart of a method for assembling optical module according to an embodiment of the present disclosure. With reference to FIG. 6, the method includes:

Step 601, controlling an alignment mechanism to place a plurality of to-be-assembled lenses to designated positions of the plurality of to-be-assembled optical parts respectively to obtain a plurality of optical modules to be aligned.

Step 602, controlling a power supply to supply power to the plurality of optical modules to be aligned, so that the plurality of optical modules to be aligned generate images.

Step 603, collecting, by a first color image collecting means and a second color image collecting means, positions and sizes of a plurality of imaging light spots corresponding to the plurality of optical modules to be aligned, and feeding the positions and sizes to a controller.

Step 604, determining a light spot that does not meet a quality requirement according to the positions and/or sizes of the plurality of imaging light spots, and generating a corresponding aligning instruction, and determining a to-be-assembled lens necessary to be adjusted according to a color of the light spot that does not meet quality requirements.

Step 605, outputting the aligning instruction to an alignment mechanism holding the lens necessary to be adjusted to adjust a position of the lens necessary to be adjusted. In the present embodiments, the controller may control the dispensing mechanism to dispense UV glue at a designated position of the optical module to be aligned, before or after the to-be-assembled lenses are aligned. After the alignment, the controller may control a UV lamp on the alignment mechanism to light, so as to perform irritation at the dispensing position to accelerate the curing of the UV glue and improve the efficiency in assembling optical modules.

In the embodiments, a plurality of groups of optical modules to be aligned are subjected to an assembling process at the same time. During the assembling process, light sources of different colors are used for the plurality of groups of optical modules to be aligned to generate images, and color image collecting means are used to collect positions and sizes of light spots and the color information of the light spots at the same time. Furthermore, the controller may recognize which to-be-assembled lenses in the optical module to be aligned need to be further aligned and how to perform aligning according to the positions and/or sizes and colors of the light spot, and generate an aligning instruction to control the corresponding alignment mechanism to perform the aligning movement. Therefore, the efficiency in assembling the optical module are improved.

It should be noted that the expressions, such as "first" and "second" in the present disclosure are used to distinguish different messages, devices, modules, etc., and do not represent the sequence, nor do they limit "first" and "second" as different types.

It should also be noted that the terms of "including", "containing" or any other variation thereof are intended to encompass non-exclusive inclusions, so that a product or system that includes a series of elements includes not only those elements but also other elements that are not explicitly listed, or elements that are inherent to this commodity or system. Without much limitation, the elements defined by the expression of "including a . . . " does not exclude the existence of other same elements in the product or system including elements as stated.

The above embodiments are only used to describe the technical solution of the present disclosure, and are not limited thereto. Although the present disclosure has been described in detail with reference to the foregoing embodiments, the skilled in the art should understand that they can still modify the technical solutions described in the foregoing embodiments, or equivalently replace some of the technical features thereof.

These modifications or replacements do not deviate the essence of the corresponding technical solutions from the spirit and scope of the technical solutions of the embodiments of the present disclosure.

The invention claimed is:

1. An apparatus for assembling optical module, comprising:
a plurality of fixtures configured to fix a plurality of to-be-assembled optical parts respectively, an alignment mechanism configured to place a plurality of to-be-assembled lenses to designated positions of the plurality of to-be-assembled optical parts respectively to obtain a plurality of optical modules to be aligned; and a power supply configured to supply power to the plurality of optical modules to be aligned;
a spectroscopic prism with a light incident surface close to the plurality of optical modules to be aligned, a first color image collecting units close to a first light emitting surface of the spectroscopic prism and being coaxial with the first light emitting surface, and a second color image collecting units with a second light emitting surface of the spectroscopic prism and being coaxial with the second light emitting surface; the first color image collecting units and the second color image collecting units are respectively configured to collect positions and sizes of a plurality of imaging light spots corresponding to the plurality of optical modules to be aligned, and feed the positions and sizes to a controller;
the controller is configured to determine a light spot that does not meet a quality requirement according to the positions and/or sizes of the plurality of imaging light spots, and generate a corresponding aligning instruction, and determine a to-be-assembled lens necessary to be adjusted according to a color of the light spot that does not meet quality requirements, and output the aligning instruction to an alignment mechanism holding the lens necessary to be adjusted to adjust a position of the lens necessary to be adjusted.

2. The apparatus according to claim 1, further comprising: a positive lens provided between the first color image collecting units and the spectroscopic prism and being coaxial with the first color image collecting units.

3. The apparatus according to claim 2, wherein the positive lens comprises an aspherical positive lens.

4. The apparatus according to claim 1, wherein the spectroscopic prism comprises two right-angle prisms with oblique surfaces bonded, and bonded surfaces are coated with a transflective dielectric film having a transmittance and a reflectance in a ratio of 1:1.

5. The apparatus according to claim 1, wherein the alignment mechanism further comprises:
a first robot arm electrically connected to the controller, and an integration mechanism mounted on the first robot arm, and a plurality of aligning heads are integrated on the integration mechanism.

6. The apparatus according to claim 1, further comprising:
a dispensing mechanism;
the dispensing mechanism comprises a second robot arm electrically connected to the controller and a UV glue dispensing syringe fixed on the second robot arm;
the dispensing mechanism is configured to perform dispensing on the plurality of to-be-assembled optical parts according to a dispensing instruction of the controller.

7. The apparatus according to claim 6, wherein the dispensing mechanism further comprises: a third image collecting units fixed on the second robot arm.

8. The apparatus according to claim 5, wherein a UV lamp is provided on the alignment mechanism and electrically connected to the controller.

9. The apparatus according to claim 1, wherein a sensor is provided on each of the plurality of fixtures and configured to detect whether a to-be-assembled optical part is placed on the fixture.

10. A method for assembling optical module applicable to the apparatus according to claim 1, comprising:
controlling the alignment mechanism to place the plurality of to-be-assembled lenses to designated positions of the plurality of to-be-assembled optical parts respectively to obtain the plurality of optical modules to be aligned;
controlling the power supply to supply power to the plurality of optical modules to be aligned, so that the plurality of optical modules to be aligned generate images;
collecting, by the first color image collecting units and the second color image collecting units, positions and sizes of the plurality of imaging light spots corresponding to the plurality of optical modules to be aligned, and feeding the positions and sizes to the controller;
determining a light spot that does not meet a quality requirement according to the positions and/or sizes of the plurality of imaging light spots, and generating a corresponding aligning instruction, and determining the to-be-assembled lens necessary to be adjusted according to a color of the light spot that does not meet quality requirements;
outputting the aligning instruction to the alignment mechanism holding the lens necessary to be adjusted to adjust a position of the lens necessary to be adjusted.

* * * * *